US012372239B2

(12) United States Patent
Dudebout

(10) Patent No.: US 12,372,239 B2
(45) Date of Patent: Jul. 29, 2025

(54) GASEOUS FUEL NOZZLE FOR USE IN GAS TURBINE ENGINES

(71) Applicant: HONEYWELL INTERNATIONAL INC., Charlotte, NC (US)

(72) Inventor: Rodolphe Dudebout, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/054,177

(22) Filed: Nov. 10, 2022

(65) Prior Publication Data

US 2024/0110520 A1 Apr. 4, 2024

Related U.S. Application Data

(60) Provisional application No. 63/378,131, filed on Oct. 3, 2022.

(51) Int. Cl.
*F23R 3/28* (2006.01)

(52) U.S. Cl.
CPC .......... *F23R 3/286* (2013.01); *F05D 2240/35* (2013.01)

(58) Field of Classification Search
CPC ............... F23R 3/286; F23R 3/14; F23R 3/12
See application file for complete search history.

(56) References Cited

U.S. PATENT DOCUMENTS 6,547,163 B1 * 4/2003 Mansour ............... B05B 1/3421 239/404
8,607,572 B2 12/2013 Koizumi et al.
8,893,500 B2 11/2014 Oskam
8,919,132 B2 12/2014 Oskam
9,182,124 B2 11/2015 Oskam
11,156,360 B2 10/2021 Boardman et al.
11,156,361 B2 10/2021 Boardman et al.
2004/0061001 A1 * 4/2004 Mao .......................... F23R 3/12 239/398
2008/0078180 A1 4/2008 Durbin et al.
2010/0170253 A1 * 7/2010 Berry ...................... F23R 3/286 60/742
2012/0204571 A1 * 8/2012 Kraemer ................ F23R 3/286 60/776
2012/0291446 A1 11/2012 Hirata et al.
2014/0041389 A1 * 2/2014 Kajimura .................. F23R 3/14 60/737
2015/0000299 A1 * 1/2015 Zuo ....................... E21B 43/166 60/776
2021/0172413 A1 6/2021 Snyder

FOREIGN PATENT DOCUMENTS

EP 4056901 A2 9/2022

* cited by examiner

*Primary Examiner* — Scott J Walthour
(74) *Attorney, Agent, or Firm* — Lorenz & Kopf, LLP

(57) ABSTRACT

A gaseous fuel nozzle includes a main body, a plurality of inner air injection passages having inlet and outlet ports, a plurality of outer air injection passages having inlet and outlet ports, and a plurality of gaseous fuel injection passages having inlet and outlet ports. At least the gaseous fuel injection outlet ports are disposed concentrically about an axis of symmetry and between the plurality of inner air injection nozzle outlet ports and the plurality of outer air injection nozzle outlet ports.

6 Claims, 7 Drawing Sheets

GASEOUS FUEL NOZZLE FOR USE IN GAS TURBINE ENGINES

CROSS-REFERENCE TO RELATED APPLICATION

This application claims the benefit of U.S. Provisional Application Ser. No. 63/378,131, filed Oct. 3, 2022, the entirety of which is hereby incorporated by reference.

TECHNICAL FIELD

The present invention generally relates to gas turbine engines, and more particularly relates to a gaseous fuel nozzle for use in gas turbine engines.

BACKGROUND

Gas turbine engines may be used to power various types of vehicles and systems. A typical gas turbine engine includes at least a compressor, a combustor, and a turbine, and may include additional components and systems, depending on the particular end-use of the gas turbine engine. During operation of a gas turbine engine, the compressor draws in, and raises the pressure of, ambient air to a relatively high level. The compressed air from the compressor is then directed into the combustor, where a ring of fuel nozzles injects a steady stream of fuel. The fuel/air mixture is combusted, generating high-energy gas. The high-energy gas expands through the turbine 106, where it gives up much of its energy and causes the turbine 106 to rotate. The gas is then exhausted from the turbine engine.

As may be appreciated, the gas that is exhausted from turbine engines may include various pollutants, such Carbon Dioxide ($CO_2$), a greenhouse gas. Thus, alternative fuels, such as hydrogen, are gaining interest as a way to reduce $CO_2$ emissions. As such there is increasing interest in developing a retrofit solution to convert liquid fuel fired turbine engines to gaseous fuel fired turbine engines or to develop turbine engines with dual-fuel capability. One suggested approach is to completely redesign the combustor. This, however, has certain drawbacks. For example, such redesigns would likely be relatively costly and relatively complex.

Hence, there is a need for a retrofit solution to convert liquid fuel fired turbine engines to gaseous fuel fired turbine engines that does not rely on costly and complex combustor redesign. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a gaseous fuel nozzle for a gas turbine engine includes a main body, a plurality of inner air injection passages, a plurality of outer air injection passages, and a plurality of gaseous fuel injection passages. The main body is adapted to be mounted on a gas turbine engine combustor, is symmetrically formed about an axis of symmetry, and has a main fuel-air outlet port formed therein. The inner air injection passages are formed in and extend through the main body. Each of the inner air injection passages has an inner air injection passage inlet port and an inner air injection passage outlet port. At least each inner air injection passage outlet port is disposed concentrically about the axis of symmetry and is in fluid communication with the main fuel-air outlet port. The outer air injection passages are formed in and extend through the main body. Each of the outer air injection passages have an outer air injection passage inlet port and an outer air injection passage outlet port. At least each outer air injection passage outlet port is disposed concentrically about the axis of symmetry and concentrically outboard of the plurality of inner air injection passage outlet ports and is in fluid communication with the main fuel-air outlet port. The gaseous fuel injection passages are formed in the main body. Each of the gaseous fuel injection passages has a gaseous fuel injection inlet port and a gaseous fuel injection outlet port. At least the gaseous fuel injection outlet ports are disposed concentrically about the axis of symmetry and between the plurality of inner air injection nozzle outlet ports and the plurality of outer air injection nozzle outlet ports and are in fluid communication with the main fuel-air outlet port.

In another embodiment, a combustion system for a gas turbine engine includes a combustor and a plurality of gaseous fuel nozzles. The combustor is configured to be mounted in a gas turbine engine and the gaseous fuel nozzles are coupled to the combustor. Each gaseous fuel nozzle includes a main body, a plurality of inner air injection passages, a plurality of outer air injection passages, and a plurality of gaseous fuel injection passages. The main body is coupled to the combustor, is symmetrically formed about an axis of symmetry, and has a main fuel-air outlet port formed therein. The inner air injection passages are formed in and extend through the main body. Each of the inner air injection passages has an inner air injection passage inlet port and an inner air injection passage outlet port. At least each inner air injection passage outlet port is disposed concentrically about the axis of symmetry and is in fluid communication with the main fuel-air outlet port. The outer air injection passages are formed in and extend through the main body. Each of the outer air injection passages have an outer air injection passage inlet port and an outer air injection passage outlet port. At least each outer air injection passage outlet port is disposed concentrically about the axis of symmetry and concentrically outboard of the plurality of inner air injection passage outlet ports and is in fluid communication with the main fuel-air outlet port. The gaseous fuel injection passages are formed in the main body. Each of the gaseous fuel injection passages has a gaseous fuel injection inlet port and a gaseous fuel injection outlet port. At least the gaseous fuel injection outlet ports are disposed concentrically about the axis of symmetry and between the plurality of inner air injection nozzle outlet ports and the plurality of outer air injection nozzle outlet ports and are in fluid communication with the main fuel-air outlet port.

In yet another embodiment, a gas turbine engine includes a compressor, a combustor, a turbine, and a plurality of gaseous fuel nozzles coupled to the combustor. Each gaseous fuel nozzle includes a main body, a plurality of inner air injection passages, a plurality of outer air injection passages, and a plurality of gaseous fuel injection passages. The main body is coupled to the combustor, is symmetrically formed about an axis of symmetry, and has a main fuel-air outlet port formed therein. The inner air injection passages are formed in and extend through the main body. Each of the inner air injection passages has an inner air injection passage inlet port and an inner air injection passage outlet port. At least each inner air injection passage outlet port is disposed concentrically about the axis of symmetry and is in fluid communication with the main fuel-air outlet port. The outer air injection passages are formed in and extend through the main body. Each of the outer air injection passages have an outer air injection passage inlet port and an outer air injection passage outlet port. At least each outer air injection passage outlet port is disposed concentrically about the axis of symmetry and concentrically outboard of the plurality of inner air injection passage outlet ports and is in fluid communication with the main fuel-air outlet port. The gaseous fuel injection passages are formed in the main body. Each of the gaseous fuel injection passages has a gaseous fuel injection inlet port and a gaseous fuel injection outlet port. At least the gaseous fuel injection outlet ports are disposed concentrically about the axis of symmetry and between the plurality of inner air injection nozzle outlet ports and the plurality of outer air injection nozzle outlet ports and are in fluid communication with the main fuel-air outlet port.

Furthermore, other desirable features and characteristics of the gaseous fuel nozzle will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

With the above in mind, it should be noted that although the fuel nozzle embodiments disclosed herein are described as being implemented in a gas turbine engine that is configured for use as an auxiliary power unit in an aircraft, it will be appreciated that the fuel nozzle embodiments may be implemented in gas turbine engines that are configured to supply propulsion, electrical power, and/or pneumatic power in aircraft and non-aircraft environments.

Figure 1:
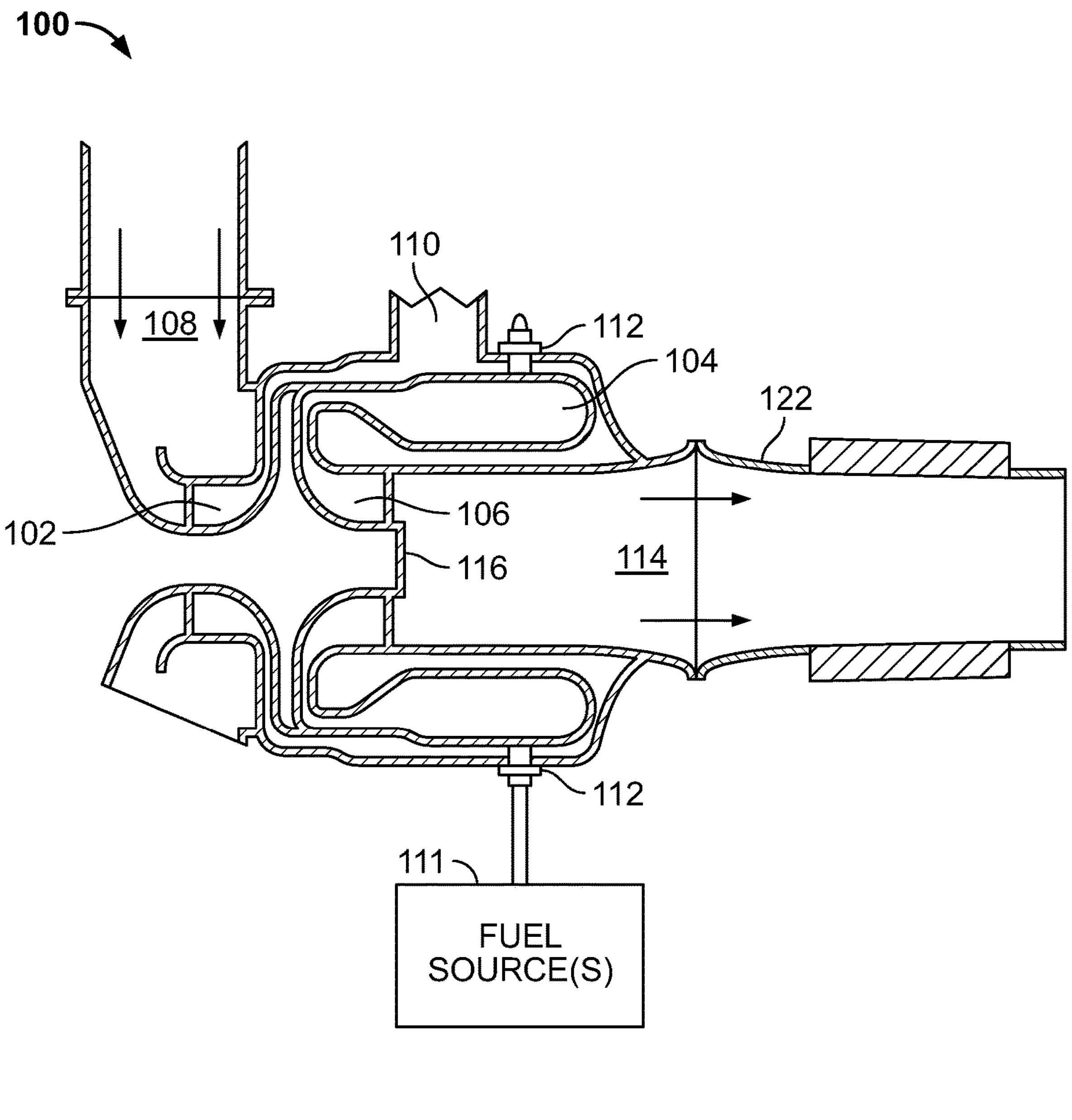
FIG. 1 depicts a simplified schematic cross section view of one embodiment of a gas turbine engine.

Turning first to FIG. 1, a simplified cross section view of an exemplary embodiment of a gas turbine engine 100 is depicted. The depicted gas turbine engine 100 is configured as an APU and includes a compressor 102, a combustor 104, and a turbine 106. Air is directed into the compressor 102 via an air inlet 108, which is coupled to an inlet duct 118. The compressor 102 raises the pressure of the air and supplies compressed air to both the combustor 104 and, in the depicted embodiment, to a bleed air outlet port 110.

In the combustor 104, the compressed air is mixed with fuel that is supplied to the combustor 104 from one or fuel sources 111 via a plurality of fuel nozzles 112. The combustor 104 may be implemented as any one of numerous types of combustors now known or developed in the future. Non-limiting examples of presently known combustors include various can-type combustors, various reverse-flow combustors, and various through-flow combustors. No matter the particular combustor configuration 104 used, the fuel/air mixture is combusted, generating high-energy gas, which is then directed into the turbine 106.

The high-energy gas expands through the turbine 106, where it gives up much of its energy and causes the turbine 106 to rotate. The gas is then exhausted from the APU 100 via an exhaust gas outlet 114, which is coupled to an outlet duct 122. As the turbine 106 rotates, it drives, via a turbine shaft 116, various types of equipment that may be mounted in, or coupled to, the APU 100. For example, in the depicted embodiment the turbine 106 drives the compressor 102. It will be appreciated that the turbine 106 may also be used to drive a generator and/or a load compressor and/or other rotational equipment, which are not shown in FIG. 1 for ease of illustration. It will be appreciated that the turbine 106 may be implemented using any one of numerous types of turbines now known or developed in the future including, for example, a vaned radial turbine, a vaneless radial turbine, and a vaned axial turbine.

The one or more fuel sources 111 includes at least a gaseous fuel source that supplies a gaseous fuel. The gaseous fuel may be one of numerous gaseous fuels such as, for example, hydrogen, methane, propane, or ammonia, just to name a few. It will be appreciated that in some embodiments, the one or more fuel sources 111 may also include a liquidous fuel source that supplies a liquidous fuel. The liquidous fuel may be one of numerous liquidous fuels such as, for example, Jet-A fuel, or Sustainable Aviation fuel, just to name a few.

Figure 2:
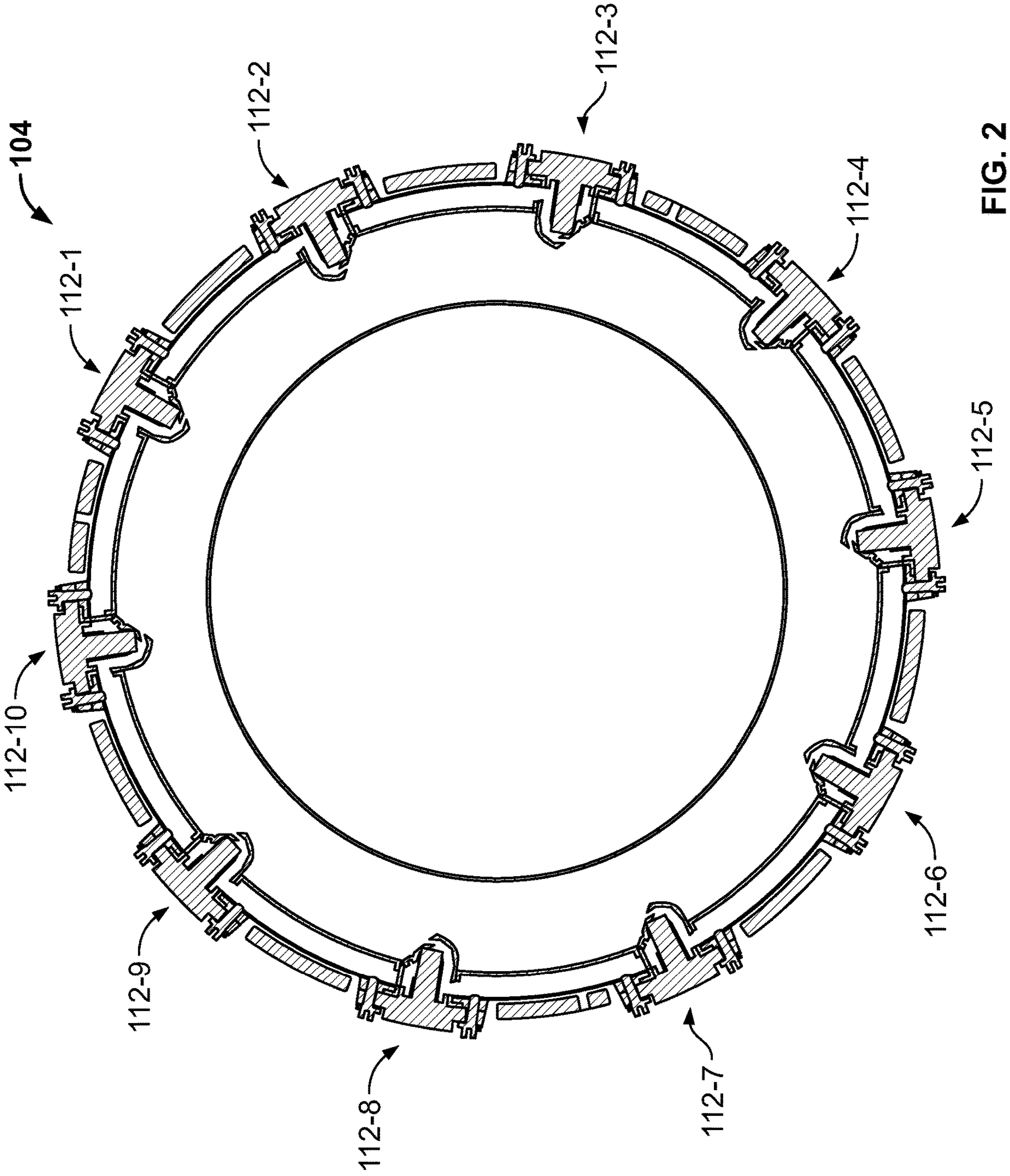
FIG. 2 depicts a cross section view of one embodiment of a combustor that may be implemented in the gas turbine engine of FIG. 1.
Figure 3:
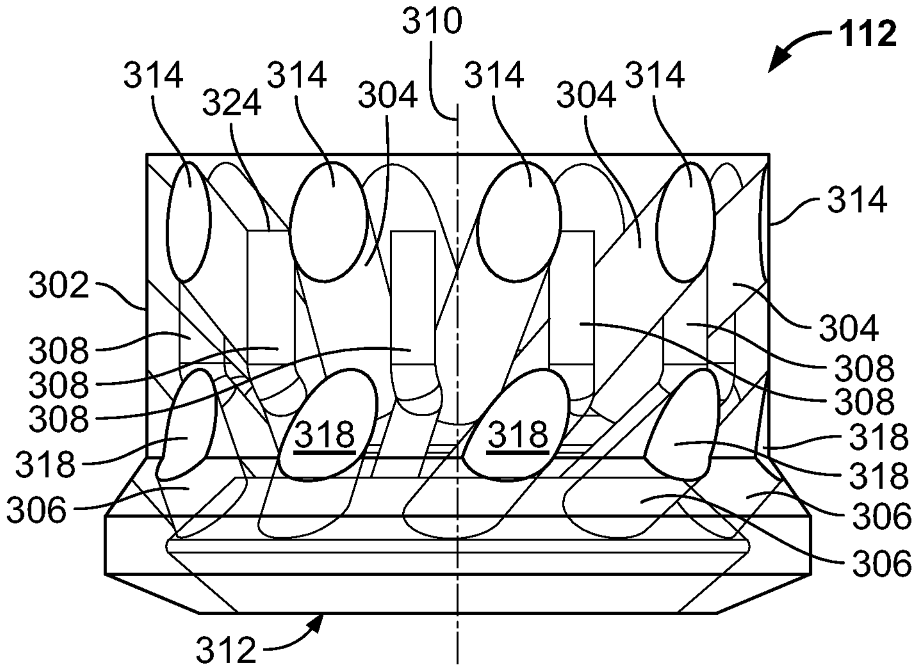
FIGS. 3-8 depict various views of one embodiment of a gaseous fuel nozzle that may be used in the gas turbine engine of FIG. 1.
Figure 4:
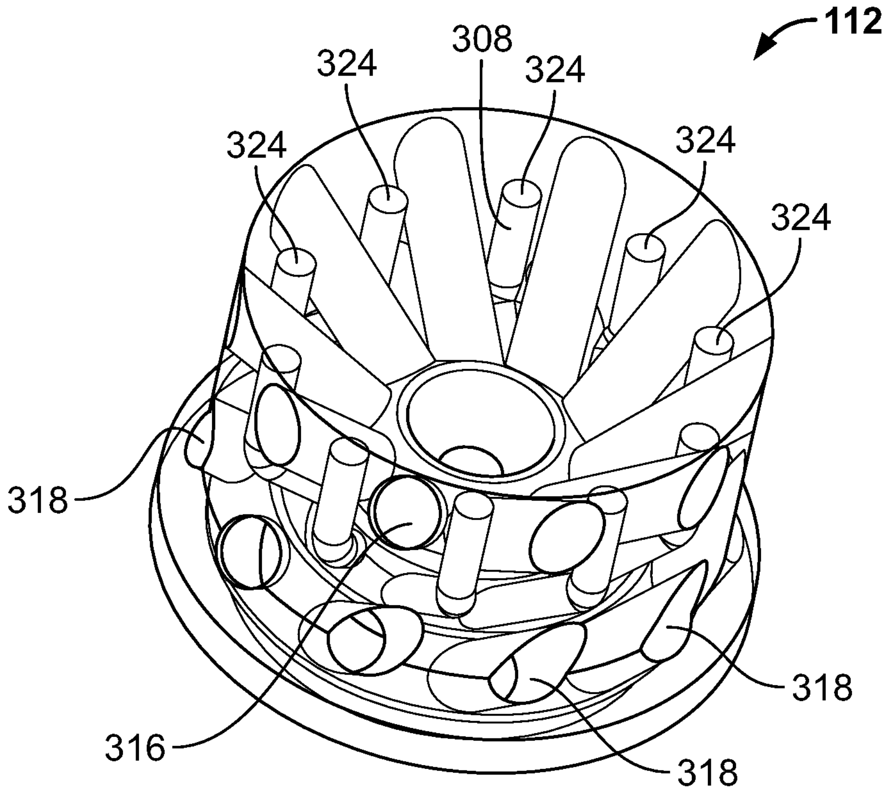
Figure 5:
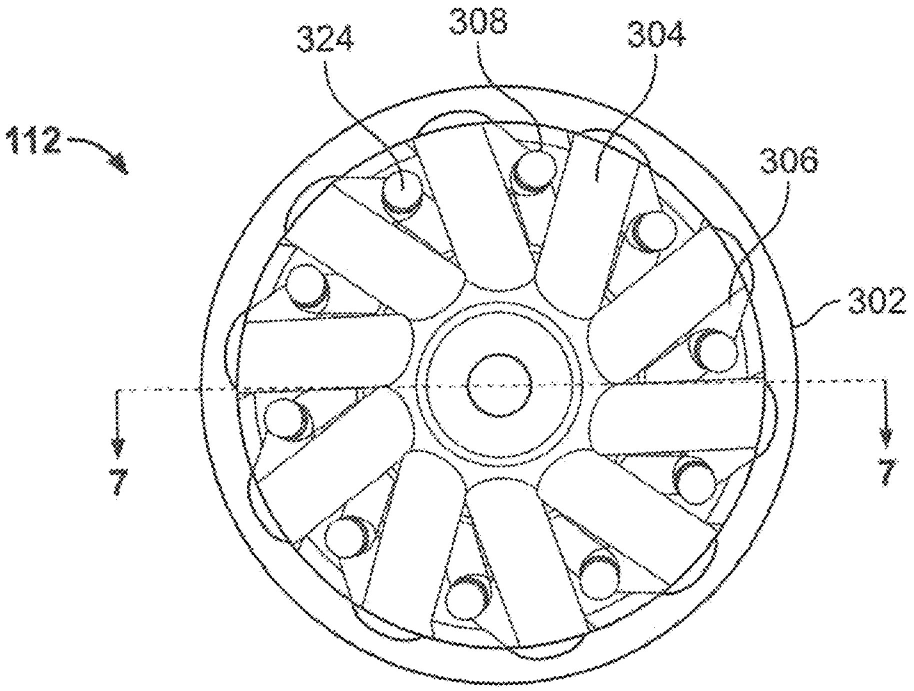
Figure 6:
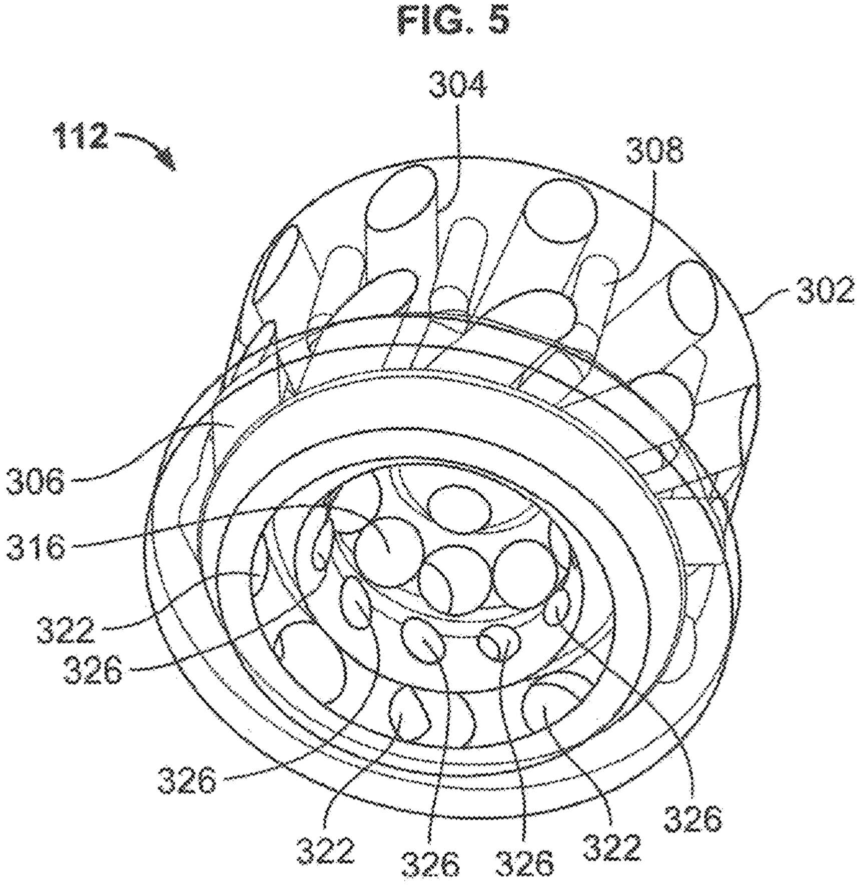

Regardless of whether or not the one or more fuel sources 111 includes a liquidous fuel source, each of the fuel nozzles 112 is uniquely configured to receive and inject compressed air and at least a gaseous fuel into the combustor 104. Thus, the fuel nozzles 112 will be further referred to herein as gaseous fuel nozzles 112. An embodiment of one of the fuel nozzles is depicted in FIGS. 3-8, and will now be described. Before doing so, however, it should be noted that the number of gaseous fuel nozzles 112 may vary. In one embodiment, which is depicted in FIG. 2, there are ten gaseous fuel nozzles 112 (e.g., 112-1, 112-2, 112-3, . . . , 112-10. It will be appreciated that other embodiments may include more or less than this number.

Turning now to FIGS. 3-8, one embodiment of a gaseous fuel nozzle 112 is depicted. The depicted gaseous fuel nozzle 112 includes a main body 302, a plurality of inner air injection passages 304, a plurality of outer air injection passages 306, and a plurality of gaseous fuel injection passages 308. The main body 302 is adapted to be mounted on a gas turbine engine combustor, such as the combustors 104 depicted in FIGS. 1 and 2. The main body 302 is symmetrically formed about an axis of symmetry 310 and has a main fuel-air outlet port 312 formed therein.

The inner air injection passages 304 are formed in, and extend through, the main body 302. Each of the inner air injection passages 304 has an inner air injection passage inlet port 314 and an inner air injection passage outlet port 316 (see FIGS. 4, 6, 7). The inner air injection passage inlet ports 314 are adapted to receive a flow of compressed air from a compressed air source, such as, for example, the compressor 102 depicted in FIG. 1, and the inner air injection outlet ports 316 are in fluid communication with the main fuel-air outlet port 312. The inner air injection passages 304 are formed such that at least the inner air injection passage outlet ports 316 are disposed concentrically about the axis of symmetry 310. However, it is seen that, at least in the depicted embodiment, the inner air injection inlet ports 314 are also disposed concentrically about the axis of symmetry 310.

The outer air injection passages 306 are formed in, and extend through, the main body 302. Each of the outer air injection passages 306 has an outer air injection passage inlet port 318 and an outer air injection passage outlet port 322 (see FIGS. 6, 7). The outer air injection passage inlet ports 318 are also adapted to receive a flow of compressed air from a compressed air source, such as, for example, the compressor 102 depicted in FIG. 1, and the outer air injection outlet ports 322 are also in fluid communication with the main fuel-air outlet port 312. The outer air injection passages 306 are formed such that at least the outer air injection passage outlet ports 322 are disposed concentrically about the axis of symmetry 310. However, as with the inner air injection passages 304, the outer air injection passage inlet ports 318 are also, at least in the depicted embodiment, disposed concentrically about the axis of symmetry 310. It is additionally noted that the outer air injection passage outlet ports 322 are disposed concentrically outboard of the plurality of inner air injection passage outlet ports 316.

The gaseous fuel injection passages 308 are formed in the main body 302, and each has a gaseous fuel injection inlet port 324 and a gaseous fuel injection outlet port 326. The gaseous fuel injection inlet ports 324 are each adapted to receive a gaseous fuel from a gaseous fuel source, such as, for example, the fuel source 111 depicted in FIG. 1, and the gaseous fuel injection outlet ports 326 are in fluid communication with the main fuel-air outlet port 312. The gaseous fuel injection passages 308 are formed such that at least the gaseous fuel injection outlet ports 326 are disposed concentrically about the axis of symmetry 110. However, it is seen that, at least in the depicted embodiment, the gaseous fuel injection inlet ports 324 are also disposed concentrically about the axis of symmetry 310. Moreover, it is additionally seen that the gaseous fuel injection outlet ports 326 are disposed between the plurality of inner air injection passage outlet ports 316 and the plurality of outer air injection passage outlet ports 322.

It should be noted that the number of inner and outer air injection passages 304, 306, and the number of gaseous fuel injection passages 308 may vary. Preferably, however, if there are N-number of gaseous fuel injection passages 308, where N is an integer, then there are M-number of inner and outer air injection passages 304, 306, where M is also an integer and is additionally an even multiple of N. For example, in the depicted embodiment, there are ten gaseous fuel injection passages 306 (i.e., N=10) and twenty inner and outer air injection passages 304, 306 (i.e., M=20, which is 2×N).

Figure 7:
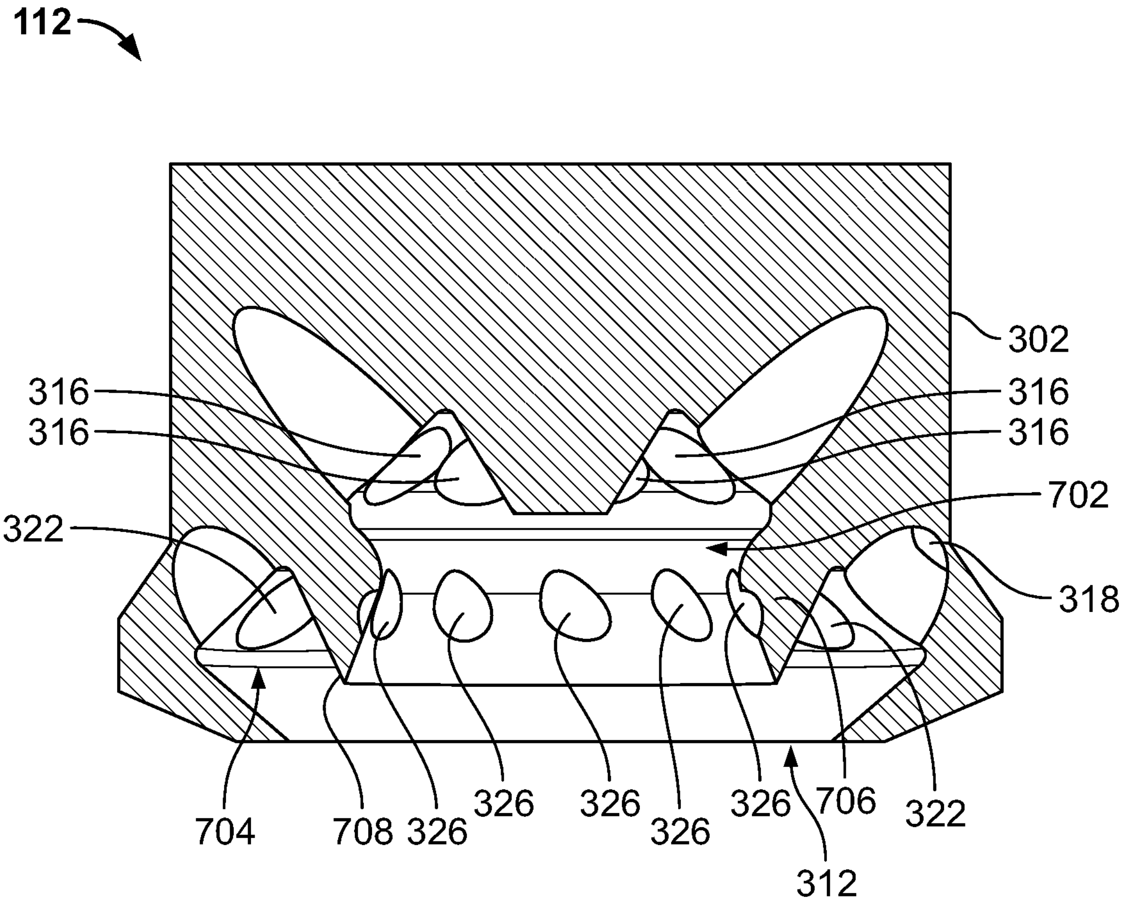
Figure 8:
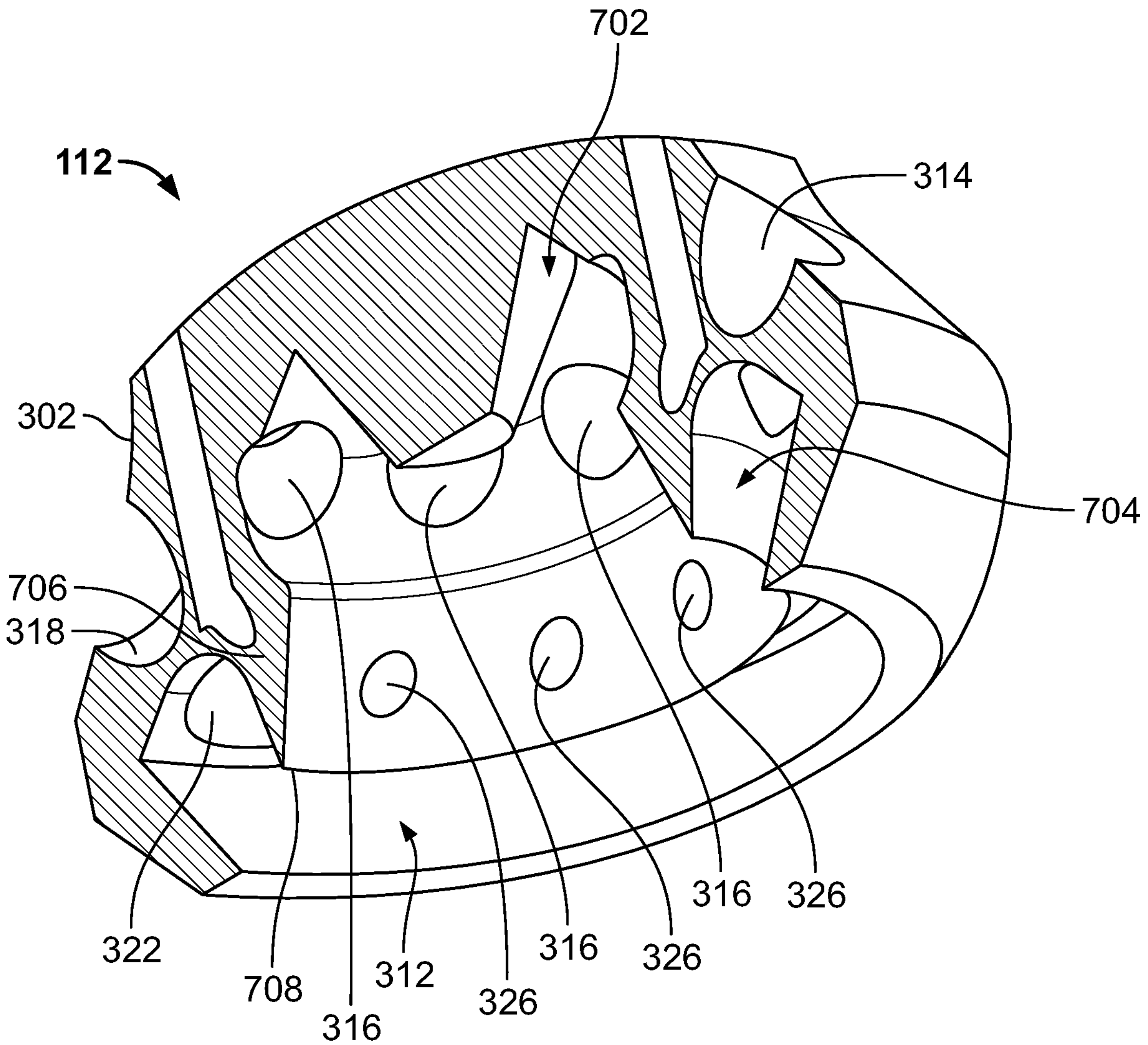

With specific reference now to FIGS. 7 and 8, it is seen that a first cavity 702 and a second cavity 704 are formed in the main body 302. The first cavity 702 is in fluid communication with the main fuel-air outlet port 312, the inner air injection passage outlet ports 316, and the gaseous fuel injection outlet ports 326. The second cavity 704 is disposed outboard of the first cavity 702 and is in fluid communication with the main fuel-air outlet port 312 and the outer air injection passage outlet ports 322. Thus, when air flows through the inner air injection passages 304, the air is discharged out the inner air injection passage outlet ports 316 into the first cavity 702. When gaseous fuel flows through the gaseous fuel injection passages 308, the gaseous fuel is discharged out the gaseous fuel injection passage outlet ports 326 into the first cavity 704. Moreover, when air flows through the outer air injection passages 306, the air is discharged out the outer air injection passage outlet ports 322 into the second cavity 704.

As is generally known, gaseous fuels, such as hydrogen, are much lower in density than liquidous fuels, such as Jet-A fuel. Additionally, gaseous fuels exhibit a much higher flame velocity than liquidous fuels. Thus, the configuration described above, in which the plurality of gaseous fuel injection outlet ports 326 is disposed between the inner air injection passage outlet ports 316 and the outer air injection passage outlet ports 322, minimizes recirculation zones and thus inhibits what is known as flame holding. This configuration also improves mixing of the gaseous fuel with the air, thereby minimizing NOx formation. More specifically, during operation, the air that is discharged out the inner air injection passage outlet ports 316 and out the outer air injection passage outlet ports 322 surrounds the gaseous fuel that is discharged out the gaseous fuel injection passage outlet ports 326 and pushes the gaseous fuel away from the gaseous fuel injection passage outlet ports 326. This promotes fuel-air mixing and allows the fuel-air mixture to burn downstream of the fuel-air outlet port 312.

In addition to the above, it is noted that the inner air injection passage outlet ports 316 and out the outer air injection passage outlet ports 322 are configured to have a tangential component such that, when air is discharged from these ports 316, 322, the air will swirl around the axis of symmetry 310. Moreover, it seen that the gaseous fuel injection passage outlet ports 326 are disposed within a conically shaped wall 706 having a relatively sharp corner 708 that is pointed toward the fuel-air outlet port 312. The swirling air that is discharged from the inner air injection passage outlet ports 316 and out the outer air injection passage outlet ports 322 meet at the corner 708 and minimize the chances for recirculation and flame hold.

The fuel nozzle described above and depicted in FIGS. 3-8 is configured to inject only a gaseous fuel into the combustor 104. There is, however, interest from some suppliers and customers to have the capability to use both gaseous fuels (e.g., hydrogen) and liquidous fuels (e.g., Jet-A), in order to accommodate a potential inadequate supply of gaseous fuel or to run a mission using gaseous fuel for a short-range mission and switching to liquidous fuel for long-range mission. Thus, in some embodiments, the gaseous fuel nozzle 112 may be configured to also inject a liquidous fuel into the combustor 104. These alternative embodiments will now be described.

Figure 9:
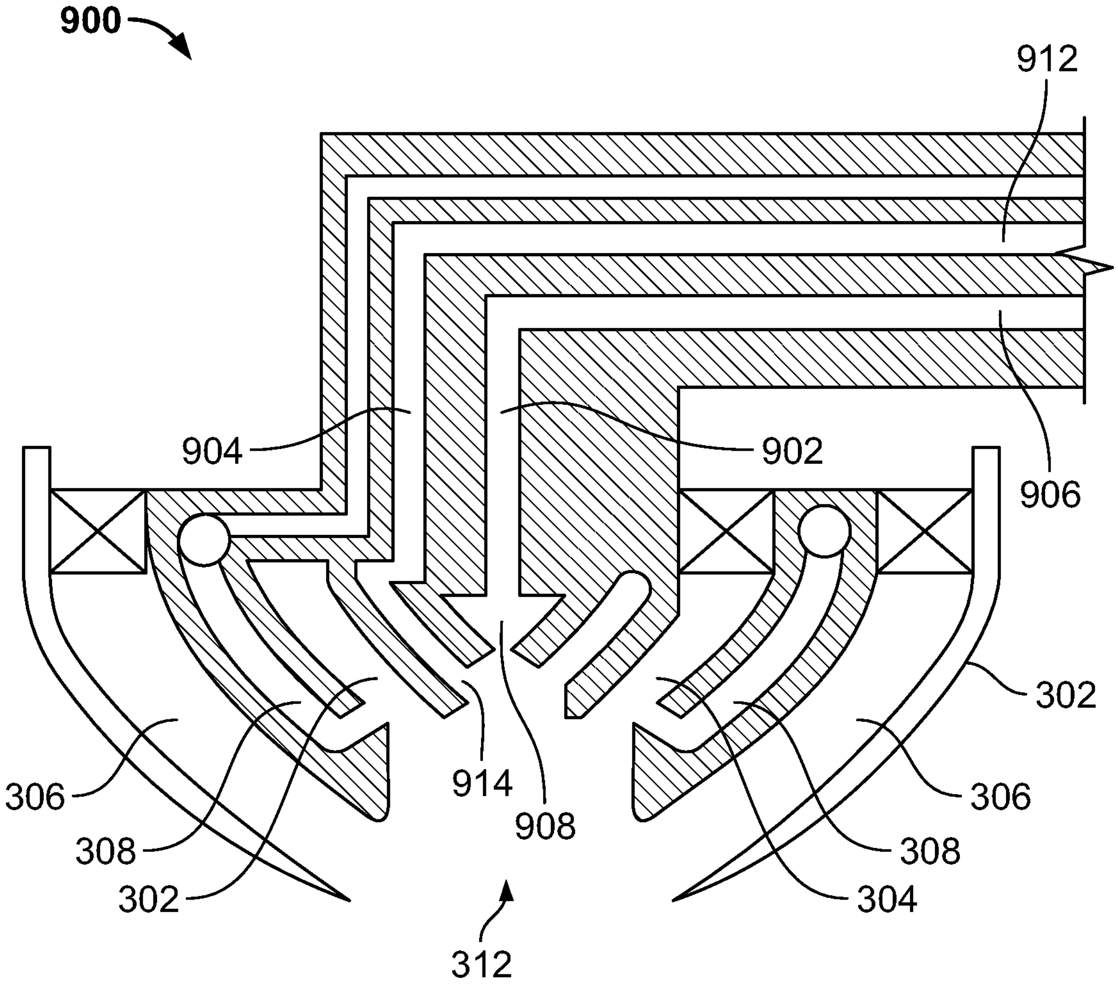
FIG. 9 depicts another embodiment of a gaseous fuel nozzle that may be used in the gas turbine engine of FIG. 1.

Referring now to FIG. 9, a cross section view of another embodiment of a fuel nozzle 900 is depicted. In this embodiment, the fuel nozzle 900 includes the main body 302, the plurality of inner air injection passages 304, the plurality of outer air injection passages 306, and the plurality of gaseous fuel injection passages 308. In addition, however, it includes a primary liquidous fuel injection passage 902 and a secondary liquidous fuel injection passage 904. The primary liquidous fuel passage 902 is formed in and extends through the main body 302 and has a primary liquid fuel inlet port 906 and a primary liquid fuel outlet port 908. As FIG. 9 depicts, at least a portion of the primary liquidous fuel injection passage 902 extends along the axis of symmetry 310. Moreover, the primary liquid fuel outlet port 908 is symmetrically disposed around the axis of symmetry 310.

The secondary liquidous fuel injection passage 904 is also formed in and extends through the main body 302. The secondary liquidous fuel injection passage 904 has a secondary liquid fuel inlet port 912 and a secondary liquid fuel outlet port 914. In the depicted embodiment, the secondary liquid fuel outlet port 914 is symmetrically disposed around the primary liquid fuel outlet port 908.

It will be appreciated that in some embodiments, the fuel nozzle 900 depicted in FIG. 9 may be implemented without the secondary liquidous fuel injection passage 904.

The fuel nozzles 112, 900 depicted and described herein provide a retrofit solution to convert liquid fuel fired turbine engines to gaseous fuel fired turbine engines that does not rely on costly and complex combustor redesign.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gaseous fuel nozzle for a gas turbine engine, comprising:

a main body adapted to be mounted on a gas turbine engine combustor, the main body symmetrically formed about an axis of symmetry and having a main fuel-air outlet port formed therein;

a plurality of inner air injection passages formed in and extending through the main body, each of the inner air injection passages having an inner air injection passage inlet port and an inner air injection passage outlet port, at least each of the inner air injection passage outlet ports disposed concentrically, and at a first common diameter, about the axis of symmetry, at least each of the inner air injection passage outlet ports in fluid communication with a first cavity formed within the main body and the main fuel-air outlet port;

a plurality of outer air injection passages formed in and extending through the main body, each of the outer air injection passages having an outer air injection passage inlet port and an outer air injection passage outlet port, at least each of the outer air injection passage outlet ports disposed concentrically, and at a second common diameter, about the axis of symmetry and concentrically outboard of the plurality of inner air injection passage outlet ports, at least each of the outer air injection passage outlet ports in fluid communication with a second cavity formed within the main body and the main fuel-air outlet port; and a plurality of gaseous fuel injection passages formed in the main body, each of the gaseous fuel injection passages having a gaseous fuel injection inlet port and a gaseous fuel injection outlet port, at least each of the gaseous fuel injection outlet ports disposed concentrically, and at a third common diameter, about the axis of symmetry and between the plurality of inner air injection passage outlet ports and the plurality of outer air injection passage outlet ports, at least each of the gaseous fuel injection outlet ports in fluid communication with the first cavity and the main fuel-air outlet port, wherein:

there are N-number of the plurality of gaseous fuel injection passages and a total of M-number of the plurality of inner air injection passages and the plurality of outer air injection passages;

there are (M/2)-number of inner air injection passages and (M/2)-number of outer air injection passages; and M is an even multiple of N.

2. The gaseous fuel nozzle of claim 1, wherein:

when air flows through the inner air injection passages, the air is discharged out the inner air injection passage outlet ports into the first cavity;

when gaseous fuel flows through the gaseous fuel injection passages, the gaseous fuel is discharged out the gaseous fuel injection passage outlet ports into the first cavity; and when air flows through the outer air injection passages, the air is discharged out the outer air injection passage outlet ports into the second cavity.

3. A combustion system for a gas turbine engine, comprising:

a combustor configured to be mounted in a gas turbine engine; and a plurality of gaseous fuel nozzles coupled to the combustor, each gaseous fuel nozzle comprising:

a main body coupled to the combustor, the main body symmetrically formed about an axis of symmetry and having a main fuel-air outlet port formed therein;

a plurality of inner air injection passages formed in and extending through the main body, each of the inner air injection passages having an inner air injection passage inlet port and an inner air injection passage outlet port, at least each of the inner air injection passage outlet ports disposed concentrically, and at a first common diameter, about the axis of symmetry, at least each of the inner air injection passage outlet ports in fluid communication with a first cavity formed within the main body and the main fuel-air outlet port;

a plurality of outer air injection passages formed in and extending through the main body, each of the outer air injection passages having an outer air injection passage inlet port and an outer air injection passage outlet port, at least each of the outer air injection passage outlet ports disposed concentrically, and at a second common diameter, about the axis of symmetry and concentrically outboard of the plurality of inner air injection passage outlet ports, at least each of the outer air injection passage outlet ports in fluid communication with a second cavity formed within the main body and the main fuel-air outlet port; and a plurality of gaseous fuel injection passages formed in the main body, each of the gaseous fuel injection passages having a gaseous fuel injection inlet port and a gaseous fuel injection outlet port, at least each of the gaseous fuel injection outlet ports disposed concentrically, and at a third common diameter, about the axis of symmetry and between the plurality of inner air injection passage outlet ports and the plurality of outer air injection passage outlet ports, at least each of the gaseous fuel injection outlet ports in fluid communication with the first cavity and the main fuel-air outlet port, wherein:

there are N-number of the plurality of gaseous fuel injection passages and a total of M-number of the plurality of inner air injection passages and the plurality of outer air injection passages;

there are (M/2)-number of inner air injection passages and (M/2)-number of outer air injection passages; and M is an even multiple of N.

4. The combustion system of claim 3, wherein:

when air flows through the inner air injection passages, the air is discharged out the inner air injection passage outlet ports into the first cavity;

when gaseous fuel flows through the gaseous fuel injection passages, the gaseous fuel is discharged out the gaseous fuel injection passage outlet ports into the first cavity; and when air flows through the outer air injection passages, the air is discharged out the outer air injection passage outlet ports into the second cavity.

5. A gas turbine engine, comprising:

a compressor, a combustor, and a turbine; and a plurality of gaseous fuel nozzles coupled to the combustor, each gaseous fuel nozzle comprising:

a main body coupled to the combustor, the main body symmetrically formed about an axis of symmetry and having a main fuel-air outlet port formed therein;

a plurality of inner air injection passages formed in and extending through the main body, each of the inner air injection passages having an inner air injection passage inlet port and an inner air injection passage outlet port, at least each of the inner air injection passage outlet ports disposed concentrically, and at a first common diameter, about the axis of symmetry, at least each of the inner air injection passage outlet ports in fluid communication with a first cavity formed within the main body and the main fuel-air outlet port;

a plurality of outer air injection passages formed in and extending through the main body, each of the outer air injection passages having an outer air injection passage inlet port and an outer air injection passage outlet port, at least each of the outer air injection passage outlet ports disposed concentrically, and at a second common diameter, about the axis of symmetry and concentrically outboard of the plurality of inner air injection passage outlet ports, at least each of the outer air injection passage outlet ports in fluid communication with a second cavity formed within the main body and the main fuel-air outlet port; and a plurality of gaseous fuel injection passages formed in the main body, each of the gaseous fuel injection passages having a gaseous fuel injection inlet port and a gaseous fuel injection outlet port, at least each of the gaseous fuel injection outlet ports disposed concentrically, and at a third common diameter, about the axis of symmetry and between the plurality of inner air injection passage outlet ports and the plurality of outer air injection passage outlet ports, at least each of the gaseous fuel injection outlet ports in fluid communication with the first cavity and the main fuel-air outlet port, wherein:

there are N-number of the plurality of gaseous fuel injection passages and a total of M-number of the plurality of inner air injection passages and the plurality of outer air injection passages;

there are (M/2)-number of inner air injection passages and (M/2)-number of outer air injection passages; and M is an even multiple of N.

6. The gas turbine engine of claim 5, wherein:

when air flows through the inner air injection passages, the air is discharged out the inner air injection passage outlet ports into the first cavity;

when gaseous fuel flows through the gaseous fuel injection passages, the gaseous fuel is discharged out the gaseous fuel injection passage outlet ports into the first cavity; and when air flows through the outer air injection passages, the air is discharged out the outer air injection passage outlet ports into the second cavity.

* * * * *